(12) United States Patent
Grider

(10) Patent No.: US 7,594,486 B2
(45) Date of Patent: *Sep. 29, 2009

(54) ENGINE CONTROL SYSTEM

(75) Inventor: Duane Grider, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,293

(22) Filed: Sep. 17, 2007

(65) Prior Publication Data

US 2008/0000454 A1 Jan. 3, 2008

Related U.S. Application Data

(63) Continuation of application No. 11/352,615, filed on Feb. 13, 2006, now Pat. No. 7,284,514.

(51) Int. Cl.
*F01L 1/34* (2006.01)

(52) U.S. Cl. .............. 123/90.15; 123/90.11; 123/90.16; 123/90.17

(58) Field of Classification Search .............. 123/90.11, 123/90.15, 90.16, 90.17, 90.31
See application file for complete search history.

(56) References Cited

U.S. PATENT DOCUMENTS

2004/0103867 A1* 6/2004 Hayase et al. ............ 123/90.11

* cited by examiner

*Primary Examiner*—Zelalem Eshete
(74) *Attorney, Agent, or Firm*—Allan J. Lippa; Alleman Hall McCoy Russell & Tuttle LLP

(57) ABSTRACT

A system for improving engine operation during a condition of engine controller degradation is presented. According to one aspect of the description, the engine may continue to operate if the performance of one engine controller is degraded.

20 Claims, 6 Drawing Sheets

ENGINE CONTROL SYSTEM

The present application is a continuation of U.S. patent application Ser. No. 11/352,615 filed Feb. 13, 2006 now U.S. Pat. No. 7,284,514, the entire contents of which is incorporated herein by reference in its entirety.

FIELD

The present description relates to a system for controlling an internal combustion engine. In particular, the system improves engine operation during a condition of engine controller degradation or deactivation.

BACKGROUND

One system to control an engine during a condition of valve actuator failure is described in U.S. Pat. No. 6,278,932. The system description presents a way to deactivate a bank of cylinders in response to a valve actuator failure. In addition, an actuator controller is provided for each bank of the engine and each controller is configured to operate valves, fuel injection, and ignition if communication between the actuator controller and engine controller is disrupted.

The above-mentioned method can also have several disadvantages. Namely, the method can cause the engine cylinders to combust air-fuel mixtures at uneven intervals between combustion events since the system deactivates an entire cylinder bank if a valve failure is detected. That is, over the course of an engine cycle (720 crankshaft angle degrees of rotation for a four-stroke engine) a first cylinder will fire (combust) followed by a first crankshaft interval, followed by a second combustion event, followed by a second crankshaft interval, followed by a second firing of the first cylinder in a second engine cycle, for example. The combustion is uneven because the first crankshaft interval distance is different than the second crankshaft interval distance. Uneven cylinder firing can cause engine noise and vibration to increase. Furthermore, continued operation of the engine in this mode may lead to further engine degradation because of the uneven torque production and engine vibration.

Another disadvantage of the before-mentioned system is that there does not appear to be a specific way to operate the engine if operation of one of the actuator controllers degrades or is deactivated. One possible action to mitigate degradation of an actuator controller is to use the same approach as when a valve actuator failure is detected, namely, to deactivate a complete cylinder bank. However, deactivating a complete cylinder bank in response to controller degradation may lead to the issues that are described above and is therefore an undesirable outcome.

The inventor herein has recognized the above-mentioned disadvantages and has developed a system that improves engine operation during degradation or deactivation of an engine controller that offers substantial improvements.

SUMMARY

One embodiment of the present description includes a system for controlling cylinders of an internal combustion engine, the system comprising: a first controller for controlling combustion in cylinders of a first group of cylinders, said first group of cylinders capable of combusting air-fuel mixtures at substantially equally spaced crankshaft angle intervals between combustion events; and a second controller for controlling combustion in cylinders of a second group of cylinders, said second group of cylinders capable of combusting air-fuel mixtures at substantially equally spaced crankshaft angle intervals between combustion events, said second controller controlling a group of cylinders different than said first controller.

In other words, the inventor herein has recognized that operation of an engine may be improved by controlling groups of cylinders that can combust air-fuel mixtures at even intervals. For example, a four cylinder engine with a firing order of 1-3-4-2 can be controlled by two controllers, each controller capable of altering combustion in two cylinders. The first controller can be configured to adjust combustion controls in cylinders 1 and 4 while the second controller can be configured to adjust combustion controls in cylinders 2 and 3. In this way, each controller operates on two cylinders that are spaced by 360 crankshaft angle degrees between power strokes, for example. That is, the power stroke of one cylinder is 360 crankshaft angle degrees from the power stroke of the other cylinder in the group, resulting in an even firing sequence and even torque production. In addition, the firing sequence for the two cylinders is symmetric over the 720 crankshaft degree engine cycle. Thus, if the operation of either controller degrades or if a controller is deactivated, the other controller can continue to control a pair of cylinders that fire evenly, thereby maintaining an even firing engine.

The present description may provide several advantages. In particular, the approach provides a system that is capable of maintaining an even firing engine even if operation of an engine controller degrades or if the controller is deactivated. This is true for inline "I" engine configurations as well as for "V" engine configurations since the controllers can be in communication with actuators and sensors of cylinders of more than a single bank of cylinders. For example, for a "V8" engine with a firing order of 1-5-4-2-6-3-7-8 can be configured with one controller in communication with cylinders 1-4-6-7 while the other controller can be in communication with cylinders 5-2-3-8. In this way, if operation of a controller degrades or if the controller is deactivated, then the other controller can regulate an even firing engine. Consequently, the engine can continue to operate in an even firing mode so that engine noise and vibration is less than that of an odd firing engine. Further, the system may be configured such that if degradation or deactivation of a valve actuator occurs the engine may continue to operate using two engine controllers in an even firing mode. For example, if valve degradation or deactivation occurs in a cylinder of a "V8" engine the engine may continue to operate as a "V6" engine whereas the before-mentioned method would operate as an uneven firing 4 cylinder engine.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
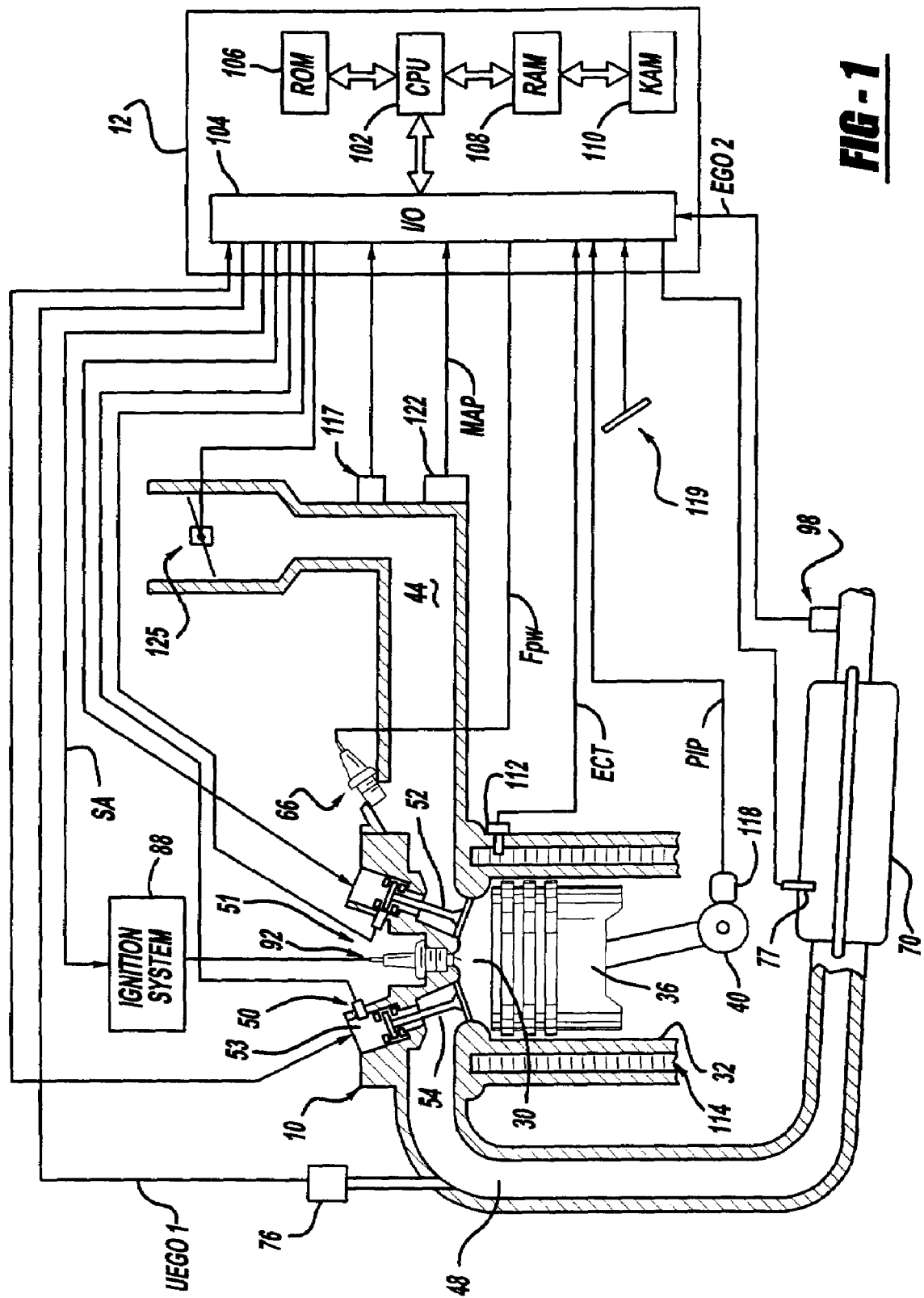
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, intake valves and/or exhaust valves may be mechanically actuated with fixed or variable timing. Further, intake valves may be electrically actuated and exhaust valves may be mechanically actuated, for example. Armature temperature is determined by temperature sensor 51. Valve position is determined by position sensor 50. In an alternative example, each of the valve actuators for valves 52 and 54 has a position sensor and a temperature sensor.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Engine controller 12 is shown in FIG. 1 as a conventional microcomputer including: microprocessor unit 102, input/output ports 104, and read-only memory 106, random-access memory 108, 110 Keep-alive-memory, and a conventional data bus. Alternatively, the controller may be comprised of more than one CPU operating on and/or sharing memory and I/O similar to that of unit 102 or more than one I/O comprised of an independent CPU acted on by a controller CPU. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber.

Note: Other, non-limiting control system embodiments illustrating configurations for systems of more than one cylinder are explained in the description of FIGS. 3 and 4.

Figure 2:
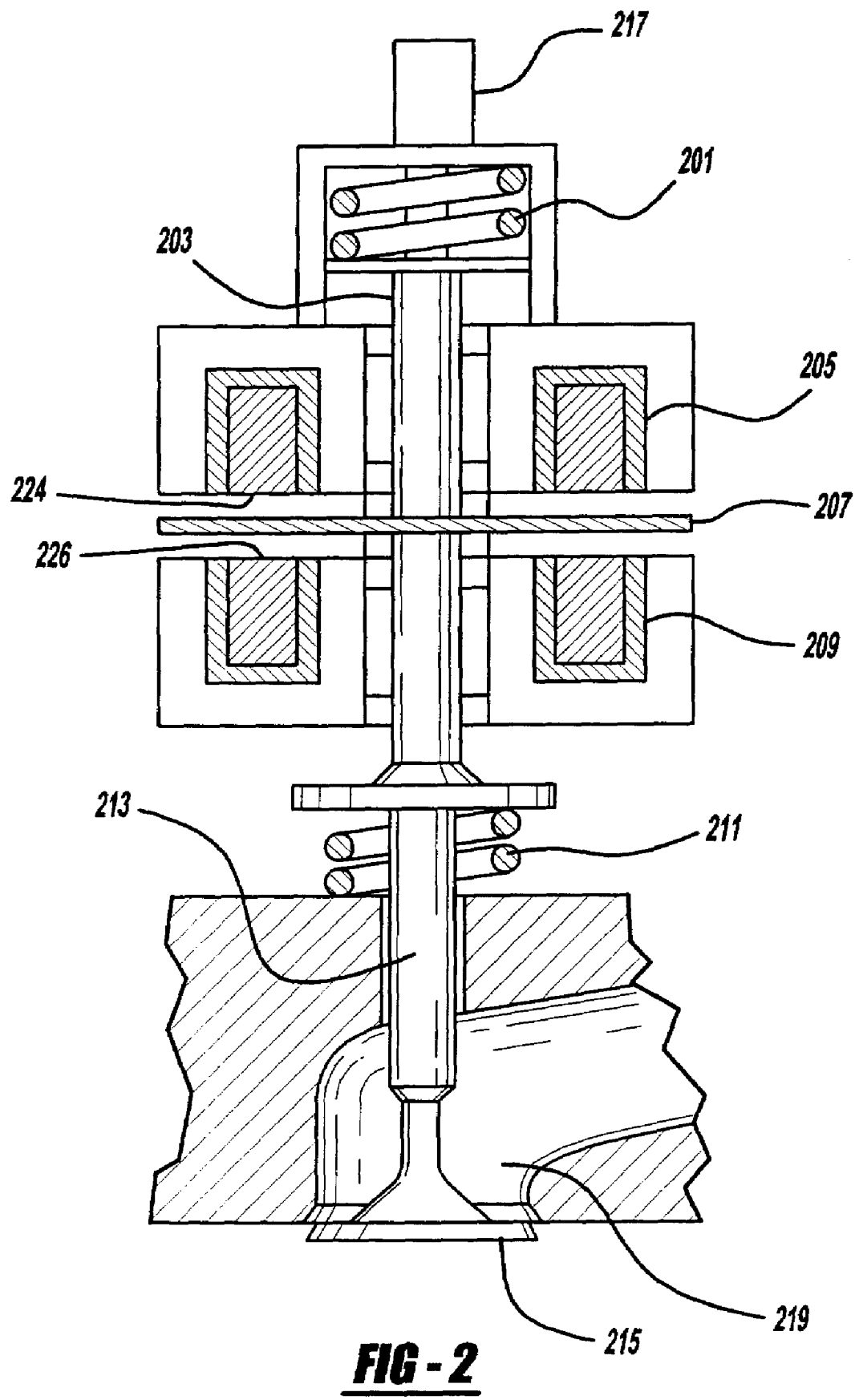
FIG. 2 is a schematic diagram of an electrically actuated valve.

Referring to FIG. 2, a schematic of an example electrically actuated valve is shown. The valve actuator is shown in a de-energized state (i.e., no electrical current is being supplied to the valve). The electromechanical valve is comprised of an armature assembly and a valve assembly. The armature assembly is comprised of an armature return spring 201, a valve closing coil 205, a valve opening coil 209, an armature plate 207, a valve displacement transducer 217, and an armature stem 203. When the valve armature is not energized the armature return spring 201 opposes the valve return spring 211, valve stem 213 and armature stem 203 are in contact with one another, and the armature plate 207 is centered between opening coil 209 and closing coil 205. This allows the valve head 215 to assume a partially open state with respect to the port 219. When the armature is in the fully open position the armature plate 207 is in contact with the opening coil magnetic pole face 226. When the armature is in the fully closed position the armature plate 207 is in contact with the closing coil magnetic pole face 224.

Figure 3:
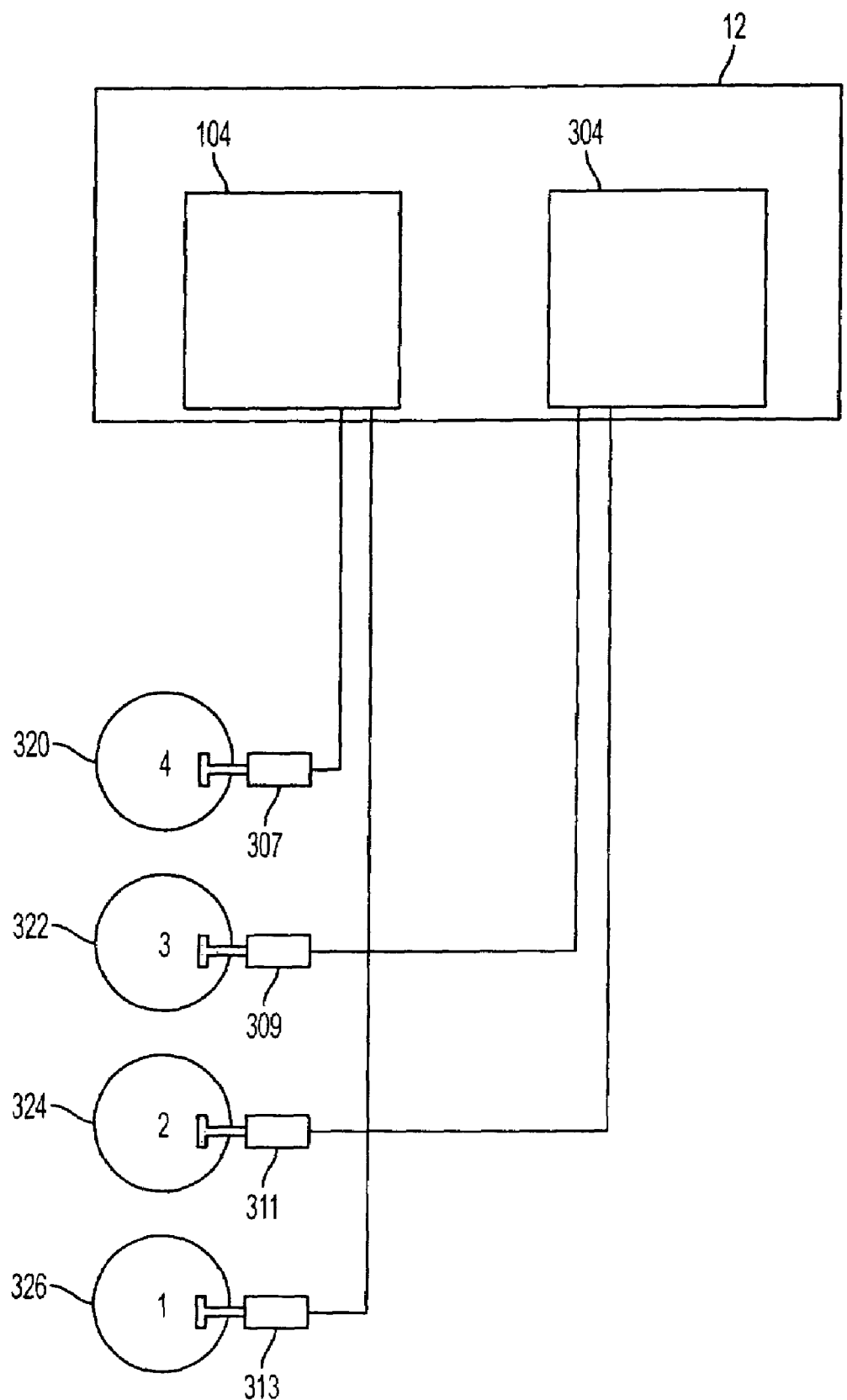
FIG. 3 is a schematic diagram of an example engine controller configuration.

Referring to FIG. 3, a schematic of an example controller configuration for a four cylinder "I" engine is shown.

Engine control unit 12 is comprised of two controllers comprising a CPU, memory, and I/O similar to the configuration explained in the description of FIG. 1. The first controller I/O 104 is in communication with sensors and/or actuators of cylinder group one. Cylinder group one is comprised of cylinders one 326, and cylinder four 320. Intake valve actuators 307 and 313 are similar to those described in FIG. 2, and are controlled via I/O 104. The intake valve actuators control air flow into the cylinders in response to commands from the first controller. Cylinder group two is comprised of cylinder two 324, and cylinder three 322. Intake valve actuators 309 and 311 are also similar to those described in FIG. 2, but are controlled via I/O 304 of the second sub-controller.

Note that valve actuators may be of an alternate design than those described in FIG. 2 without departing from the sprit or intent of this description. Further, the controllers may be integrated into a single control unit or they may be separated into two distinct control units. Further still, the controllers may be configured with a wide variety of I/O that is not beyond the scope of this description yet is not shown so that the complexity of the figure is reduced. For example, electrically actuated intake valves are shown in communication with I/O ports 104 and 304, however, the system configuration could just as easily include exhaust valves, spark plugs, charge motion control valves, fuel injectors, and/or electrically controlled throttles. These actuators may be configured in any desirable combination or sub-combination without deviating from the scope or intent of this description. Thus, each sub-controller can have complete or partial control over the respective cylinder control actuators and/or sensors.

From FIG. 3 it is possible to see that each controller has the capacity to control a group of cylinders without necessarily altering the operation of the other group of cylinders. As a result, either controller can continue to operate the cylinders under its control even though performance of the other controller may degrade to the point where cylinders under its control are deactivated. Thus, either controller can operate the engine as an even firing engine, operating with two cylinders, or together the controllers combine to operate an even firing four cylinder engine. Operation of an even firing engine by a single controller is maintained by configuring the controllers so that they operate on cylinders that are evenly spaced over an engine cycle. In this example, cylinders 1 and 4 are evenly spaced and so are cylinders 2 and 3. Thus, connecting each controller to actuators of a group of cylinders that are evenly spaced allows the engine to operate as an even firing engine even if performance of one controller degrades or if the controller is deactivated.

The controllers can also be configured to communicate with each other via a CAN link or by a serial link, for example. Alternatively, sensor and/or actuator controllers may be in communication with a supervisory controller that issues commands to and that monitors the status of lower level controllers. By linking the controllers each controller can determine the status of another controller. This allows an active controller to take actions to mitigate engine torque fluctuations if one controller goes to a degraded status or is deactivated. For example, if a controller recognizes degraded performance of another controller then the active controller can adjust valve timing, fuel injection timing, throttle position, and/or spark advance so that torque fluctuations are mitigated. Of course, other combinations and sub-combinations of the before-mentioned actuators and/or sensors may be used to mitigate torque fluctuations as well.

Figure 4:
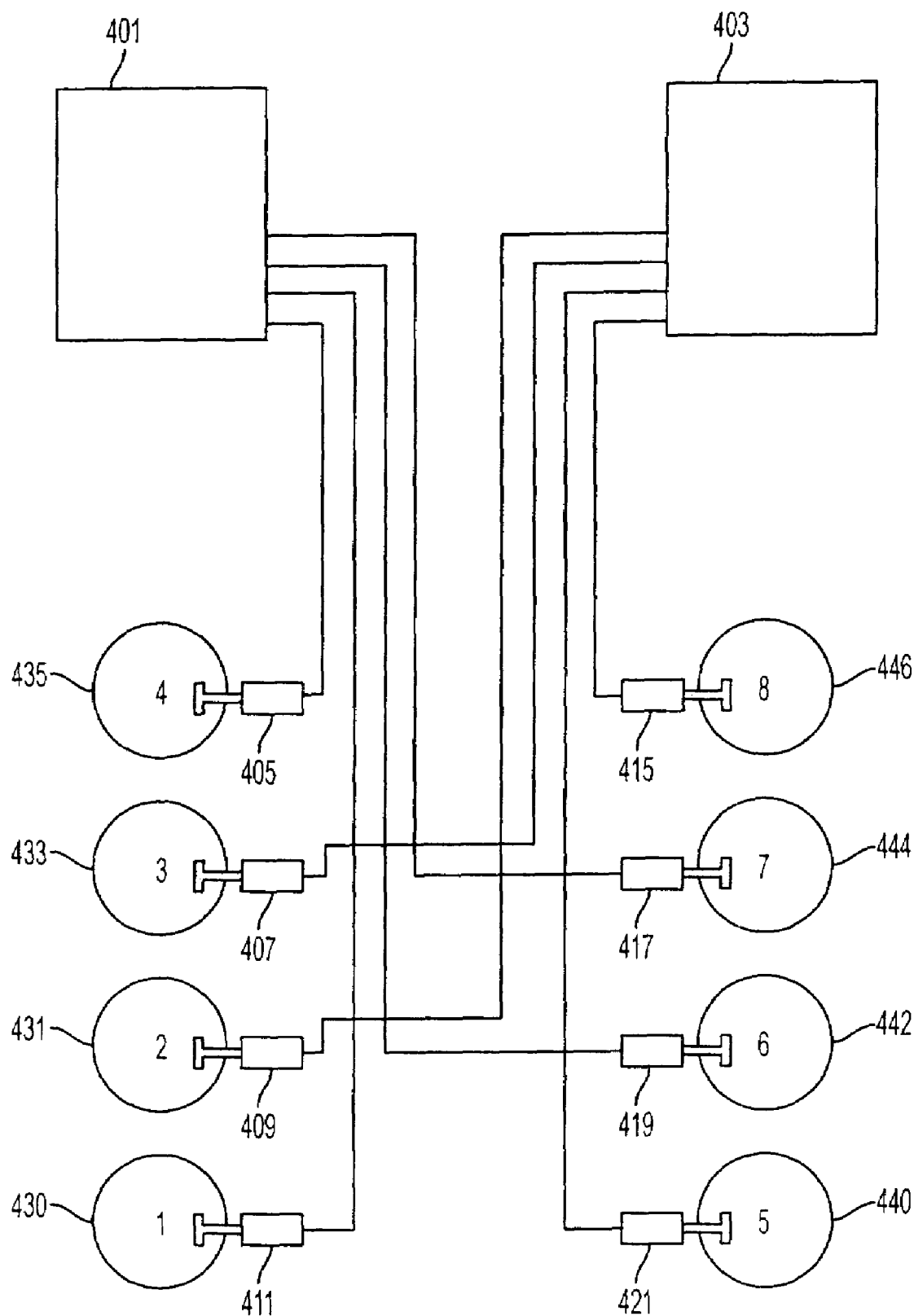
FIG. 4 is a schematic diagram of another example engine controller configuration.

Referring now to FIG. 4, a schematic of an example controller configuration for an eight cylinder "V" engine is shown.

The first controller 401 is shown is in communication with sensors and/or actuators of cylinder group one. Cylinder group one is comprised of cylinders one 430, cylinder four 435, cylinder six 442, and cylinder seven 444. Intake valve actuators 411, 405, 419, and 417 are similar to those described in FIG. 2, and are controlled via I/O. The intake valve actuators control air flow into the cylinders in response to commands from the first controller.

The second controller 403 is shown is in communication with sensors and/or actuators of cylinder group two. Cylinder group two is comprised of cylinder two 431, cylinder three 433, cylinder five 440, and cylinder eight 446. Intake valve actuators 409, 407, 421, and 415 are also similar to those described in FIG. 2 and are controlled via I/O of the second controller.

Similar to the configuration illustrated in FIG. 3, the controller configuration of FIG. 4 allows the engine to be operated as an even firing engine if one controller is deactivated or if performance of one controller degrades and the engine is operated by a single controller. For example, if the second controller 403 is deactivated so that the cylinders under its control are deactivated, then the engine can continue to operate as an even firing four cylinder engine using cylinders 1, 4, 6, and 7. On the other hand, if the performance of the first controller 401 degrades the engine can be operated as an even firing four cylinder engine by operating cylinders 2, 3, 5, and 8. Again, the even firing order is a result of configuring each controller with a cylinder group that will result in an even firing engine even if one or the other controllers is deactivated or if its performance degrades. Further, this concept may be extended to engine configurations different than the I4 and V8 examples shown in FIGS. 4 and 5. For example, six cylinder engines of V or I configuration, four cylinder opposed engines, 10 cylinder engines, and 12 cylinder engines.

Each controller can operate the engine as an even firing four cylinder because of the wiring configuration between the controller, actuators, and cylinders. In other words, the controllers are advantageously wired to cylinders that can be operated as an even firing engine. Thus, by properly configuring the engine system, substantially equivalent spacing between combustion events can be achieved. Of course, spacing (in crankshaft angle degrees) between pistons being positioned at a specific location (e.g., top-dead-center compression stroke) can be related to crankshaft position, however, the initiation of combustion can vary by 20 crankshaft angle degrees or more, but variation of spark location is based on engine operating conditions and is therefore considered to be substantially constant. For example, the spark advance relative to top-dead-center of each cylinders respective compression stroke, can vary by 20 crankshaft angle degrees, for example, but is considered substantially constant because the mechanical spacing between individual cylinders reaching a selected location is fixed by the even crankshaft geometry between cylinders of the group.

The controller configuration of FIG. 4 also allows both controllers to continue to operate if sensor and/or actuator performance is degraded or is deactivated so that the eight cylinder engine can be operated as an even firing six cylinder engine, for example. Further, a similar controller configuration could allow a six cylinder to operate as an even firing four cylinder engine. Thus, by configuring controllers to operate selected cylinders, cylinders that can be configured to have equal distances between cylinder events (e.g., combustion events or a selected piston position such as top-dead-center compression stroke) the engine may be operated as an even firing engine even during conditions of controller and/or actuator/sensor degradation.

Note that cylinders can be advantageously grouped for four, six, eight, ten, and twelve cylinder engines so that degradation or deactivation of a controller will still permit the engine to operate in an even firing mode. In addition, it is also possible to employ more than two controllers to benefit from the advantages shown in this description. For example, four or even eight controllers may be configured to operate an eight cylinder engine in the same manner as described above and therefore the illustrated embodiments are not meant to limit the breadth and scope of the description.

Figure 5A:
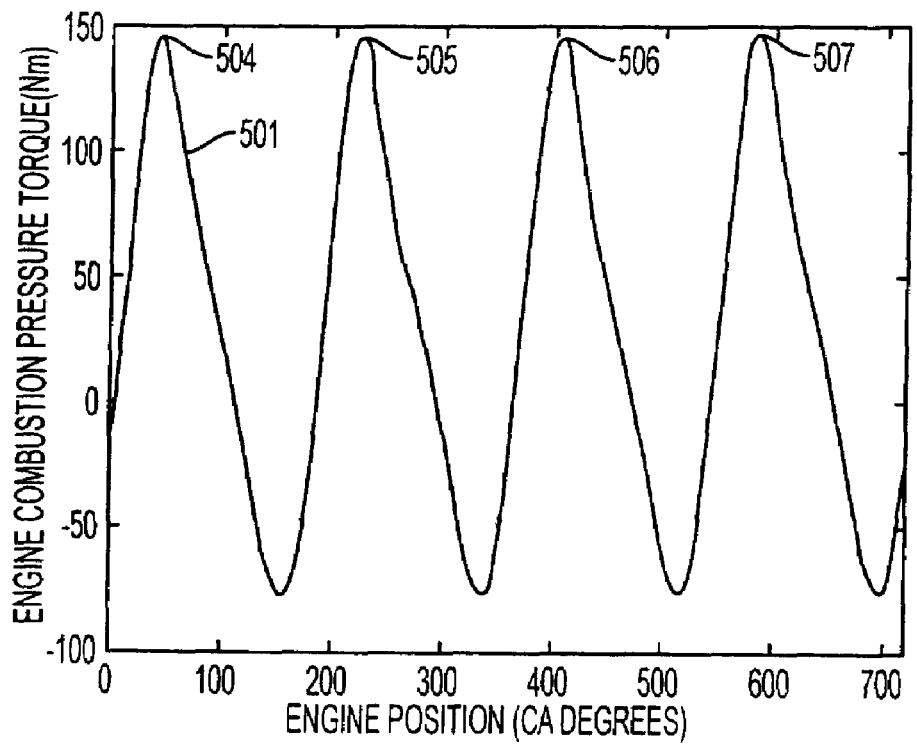
FIG. 5a is a plot of engine torque for a four cylinder engine operating with four active cylinders.

Referring now to FIG. 5a, a simulation of engine torque output during a cycle of an engine operated by two controllers is shown. Line 501 represents the trajectory of engine torque for four active cylinders of a four cylinder engine operating in a four stroke mode. The engine has a firing order of 1-3-4-2. Over a cycle of the engine (i.e., 720 crankshaft angle degrees) each cylinder combusts an air-fuel mixture and produces torque. Notice that the torque trajectory exhibits four torque peaks, each peak corresponds to the peak torque generated by an individual cylinder. Location 504 is the peak torque for cylinder one, location 505 is the peak engine torque for cylinder three, location 506 is the peak engine torque for cylinder four, and location 507 is the peak engine torque for cylinder number two. The crankshaft angular degrees between the peak torque levels generated by the individual cylinders is shown to be nearly constant. However, variations of spark timing, air charge, cylinder temperature, and fuel amount can alter the location of peak torque between cylinder events but the 20-30 degree window of variation can be viewed as a substantially constant, relative to the distance between cylinder combustion events.

Figure 5B:
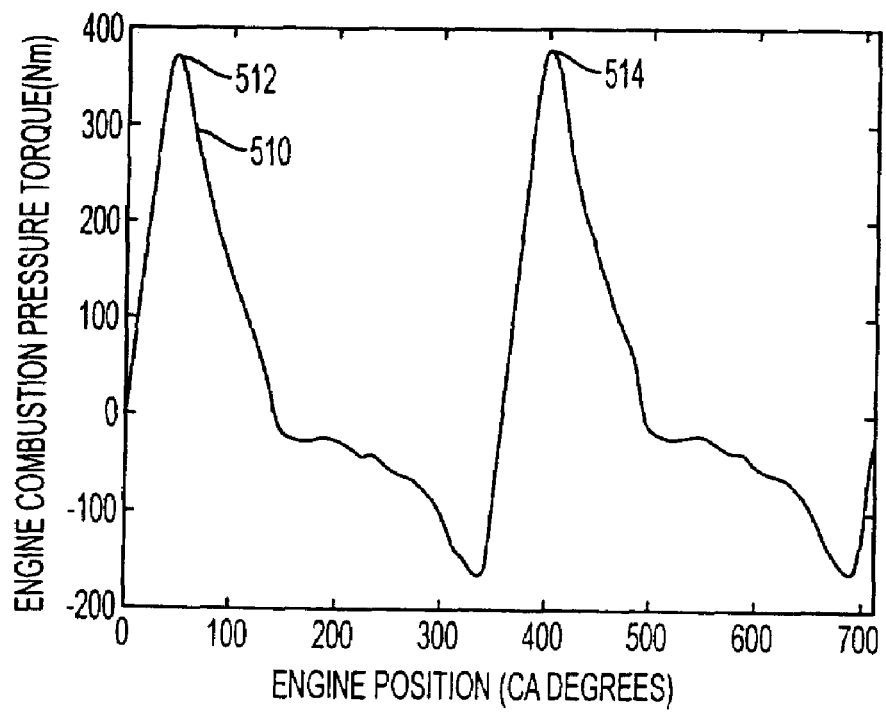
FIG. 5b is a plot of engine torque for a four cylinder engine operating with two active cylinders.

Referring now to FIG. 5b, another simulation of engine torque output during a cycle of an engine is shown. However, the simulated conditions of FIG. 5b illustrate engine torque for a two controller system where operation of one controller has degraded to the point were two of the four cylinders are inactive (not combusting). Line 510 represents the trajectory of engine torque of a four cylinder engine operating in a four stroke mode with two active cylinders. The torque trajectory of this cycle shows two equally spaced torque peaks representing two cylinders of a cylinder group (e.g., cylinders 1 and 4) operated by the active controller while the two remaining cylinders (2 and 3) are inactive during a period of degradation of a second controller, for example. If the plot were to continue for another engine cycle, the two torque peaks would be repeated at the same relative crankshaft positions. Location 512 is the peak torque for cylinder one and location 514 is the peak engine torque for cylinder four. If the simulation conditions are altered such that cylinders 1 and 4 are inactive due to degradation of a controller, for example, and cylinders 2 and 3 are active, then two torque pulses similar to those depicted by line 510 but at different crankshaft angular positions would be shown.

Thus, FIGS. 5a and 5b show that engine controllers can be configured to continue to operate an engine in an even firing configuration even if the performance of one controller is degraded or if the controller is deactivated. This allows the engine to operate with less noise and/or vibration. Further, as mentioned above, different types of actuators may be configured with the controllers such that an engine may continue to operate with even combustion if spark and/or fuel systems of a fixed valve timing engine degrade. As such, the sensor and/or actuators configured with the respective controllers are not meant to limit the breadth or scope of the description.

Figure 6:
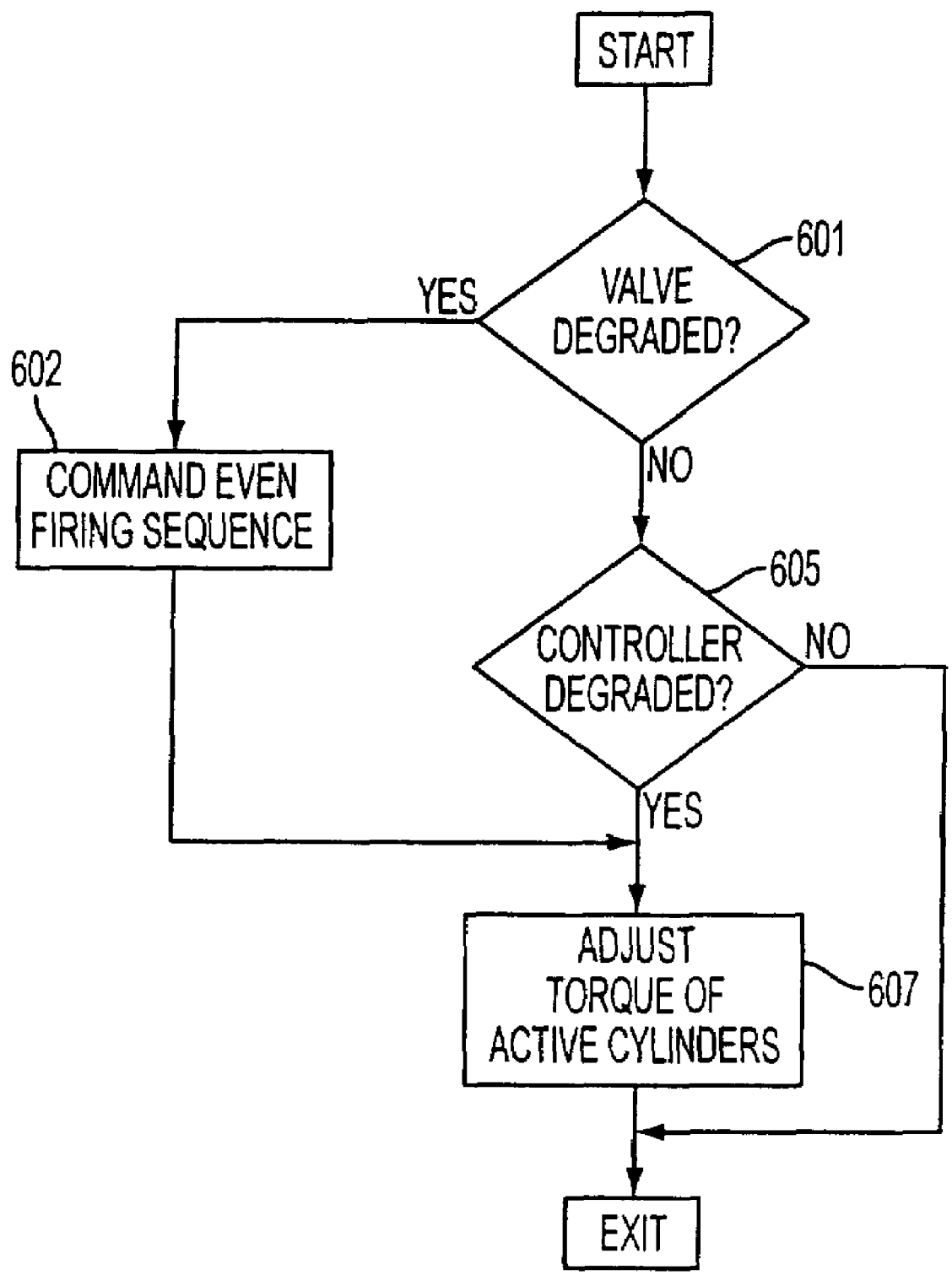
FIG. 6 is a flow chart of a method to control an engine during degradation of a valve or controller.

Referring now to FIG. 6, a flow chart of a method to control an engine during valve or controller degradation is shown. Performance degradation of a cylinder valve and\or a controller may result in loss of engine torque production. This can cause engine speed to drop and may be objectionable to an operator. Therefore, it can be desirable to mitigate the effects of controller and/or valve degradation. The method described by FIG. 6 provides a way of handling such degradation.

In step 601, the routine determines if there has been an indication of valve degradation. Valve degradation may be determined by observing engine operating conditions (e.g., exhaust gas conditions, engine speed) or by observing valve conditions (e.g., valve impedance, valve current, valve temperature). If there is an indication of valve degradation then the routine proceeds to step 602, if not, the routine proceeds to step 605.

In step 602, the engine control is set so that combustion of air-fuel mixtures occurs in an even firing sequence. Depending on the level of valve degradation, the torque capacity of a cylinder may be reduced by limiting the cylinder charge or the cylinder may be deactivated (i.e., not combusting an air-fuel mixture), for example. If a cylinder is deactivated then another cylinder may also be deactivated by the system so that the engine retains an even firing order. For example, if a cylinder of an eight cylinder engine is deactivated then an additional cylinder can be deactivated so that the engine operates as an even firing six cylinder. Controllers can exchange status information between each other so that a cylinder under the control of a different controller (i.e., a controller other than the controller that controls the degrade valve) can be deactivated, if necessary, to operate the engine in an even firing mode. Alternatively, depending on the engine firing order, deactivated cylinder number, and level of degradation a single controller may deactivate both cylinders so that the engine is even firing. The routine then proceeds to step 607.

In step 605, the routine determines if one or more controllers have degraded. Status information may be shared between controllers such that if one controller degrades other controllers can be made aware so that mitigating actions may be taken by the remaining controllers. If there is no degradation the routine proceeds to exit. If there is degradation the routine proceeds to step 607.

In step 607, torque in active cylinders can be adjusted to mitigate the torque loss that may occur as a result of cylinder deactivation or cylinder output torque reduction. The torque of active cylinders may be increased by increasing the valve opening duration, valve phase, advancing spark timing, and/or adjusting the throttle position. Various combinations or sub-combinations of the before-mentioned control adjustments can be commanded by the active controller so that the active cylinders provide some compensation for the deactivated cylinders.

Of course, the method of FIG. 6 may be implemented in a different execution order or by using modifications that deviate from the method shown yet do not deviate from the intent or scope of the present description. Further, the method may be stored in non-volatile memory and only read and executed when requested or may be loaded into volatile memory at start-up.

This concludes the description. The reading of it by those skilled in the art would bring to mind many alterations and modifications without departing from the spirit and the scope of the description. For example, 14, V6, V8, V10, and V12 engines operating in natural gas, gasoline, diesel, or alternative fuel configurations could use the present description to advantage.

The invention claimed is:

1. A method for controlling an internal combustion engine, the method comprising:

operating an engine with a first and a second group of cylinders, said first group of cylinders operated by a first controller and said second group of cylinders operated by a second controller, the engine operating with a plurality of valves in each of the first and second groups of cylinders;

deactivating one of the first and second groups of cylinders during a condition of degradation of said first controller and continuing to operate said engine with an even firing order by said second controller; and adjusting torque in active cylinders by said second controller to mitigate torque loss resulting from deactivating said group of cylinders by increasing a valve opening duration for active cylinders.

2. The method of claim 1 wherein said torque is further adjusted by adjusting a position of a throttle.

3. The method of claim 1 wherein said torque is further adjusted by increasing valve phase.

4. The method of claim 1 wherein at least one valve of said plurality of valves is an electrically actuated valve.

5. The method of claim 1 wherein said internal combustion engine is an eight cylinder engine.

6. A method for controlling an internal combustion engine, the method comprising:

operating an engine with a first and a second group of cylinders, said first group of cylinders operated by a first controller and said second group of cylinders operated by a second controller;

deactivating said first group of cylinders during a condition of degradation of said first controller and continuing to operate said engine with an even firing order; and adjusting the position of a throttle to mitigate torque loss that may occur as a result of deactivating said first group of cylinders.

7. The method of claim 6 further comprising adjusting an output of said second controller to compensate for degradation of said first controller.

8. The method of claim 7 wherein said output is a control signal for controlling the operation of a valve.

9. The method of claim 6 wherein said throttle is an electronic throttle.

10. The method of claim 6 wherein said first controller operates at least one electrically actuated valve.

11. The method of claim 6 wherein said first controller communicates to said second controller.

12. The method of claim 6 wherein said internal combustion engine is an eight cylinder engine.

13. A system for controlling an internal combustion engine, the method comprising:

a first controller configured to control a first group of cylinders that can operate said engine in an even firing order, said first controller configured to adjust torque produced by said first group of cylinders during a condition of degradation of a second controller; and said second controller configured to control a second group of cylinders that can operate said engine in an even firing order, said second group of cylinders different than said first group of cylinders, and said second controller configured to adjust torque produced by said second group of cylinders during a condition of degradation of said first controller.

14. The system of claim 13 further comprising adjusting an output of said second controller to compensate for the degradation of said first controller.

15. The system of claim 14 wherein said output is a control signal for operating a valve.

16. The system of claim 13 wherein said first controller communicates to said second controller.

17. The system of claim 13 wherein said first controller adjusts torque in active cylinders to mitigate torque loss of deactivated cylinders.

18. The system of claim 13 wherein said first controller adjusts torque in active cylinders by advancing spark timing.

19. The system of claim 13 wherein said first controller adjusts torque in active cylinders by adjusting throttle position.

20. The system of claim 13 wherein said first controller adjusts torque in active cylinders by increasing valve opening duration.

* * * * *